Patented Feb. 20, 1934

1,948,433

UNITED STATES PATENT OFFICE 1,948,433

METHOD OF MAKING CEMENT

Willoughby E. Snyder, Allentown, Pa.

No Drawing. Application March 30, 1933
Serial No. 663,577

15 Claims. (Cl. 106—25)

This invention relates to the making of cement, and it is an object of the invention to provide an improved cement and method of making same.

An important object of the invention is to provide a cement making composition, preparatory to clinkering, which will have a fineness far beyond that of known practice, so that when this extremely finely divided material is subjected to the high temperature of the clinkering step, its extreme fineness will occasion a more thorough heating of the material so that there will result therefrom a better and a more thorough reaction between the lime oxide and the silica and alumina present in the composition, thereby to form the calcium silicates and calcium aluminates essential to the production of cement and for giving the same its hydraulic properties.

In carrying out the present invention, I employ a raw material having a lime base, i. e. one in which calcium carbonate predominates or in other words a calcareous material, and another raw material in which clay predominates, or in other words, an argillaceous material. The raw calcareous material is first crushed, provided of course that crushing to smaller size is necessary. The calcareous or lime base material is subjected to an elevated temperature, short of clinkering, but high enough to calcine and convert the calcium carbonate thereof to calcium oxide, the temperature being insufficient to produce hydraulic properties in the material. The argillaceous material or clay, containing silica and alumina, is also subjected to an elevated temperature, short of clinkering, to dehydrate the same, the temperature being insufficient to produce hydraulic properties therein. It will here be pointed out that the heat-treatment of the calcareous material and of the argillaceous material is not such as could possibly form calcium silicates and calcium aluminates at this stage of the procedure, and it will be further pointed out that it is an important object of the present invention to postpone the formation of calcium silicates and calcium aluminates, essential to the hydraulic qualities of cement, until the material has reached the clinkering step of the method.

The heat-treated calcareous material, in which the calcium carbonate has been converted to calcium oxide is then hydrated by subjecting it to the action of water, without any grinding of the material. The elevated temperature produced by the exothermic heat generated by the hydration of the lime oxide together with the violent agitation of the reaction brings about a disintegration of the calcareous material to a powdery mass having a degree of fineness considerably beyond that of known practices and beyond that which can be obtained by any grinding operation known to applicant.

After hydrating the calcareous material to a finely divided powdery condition, the heat-treated argillaceous material and the hydrated calcareous material are brought together and mixed with one another thereby forming the cement making composition of the present invention. The finely divided condition of the heat-treated argillaceous material and the heat-treated and hydrated calcareous material enables the most intimate mixing of these materials.

The powdery composition is then clinkered in any suitable or preferred manner as by a clinkering kiln. During the clinkering operation the hydrated lime or calcium hydrate is first decomposed and reconverted to an oxide and thereafter the lime oxide will react with the silica and alumina of the argillaceous material thereby forming the calcium silicates and the calcium aluminates which are essential to cement making and which give the cement its hydraulic properties. It will here be explained that during the clinkering operation and due to the extremely finely divided condition of the mass of material there will be a more thorough heating of each individual particle of the material and thus there will result a better and more thorough decomposing and reconverting of the hydrated lime to oxide form, and then a more thorough reaction between the lime oxide and the silica and alumina of the argillaceous material with the result that there is formed a very much greater percentage of calcium silicates and calcium aluminates than in standard practice or in any practice known to applicant thus producing a cement having greater hydraulic properties and which will produce concrete having materially increased strength.

After clinkering, the clinker should be pulverized in any suitable or preferred manner to bring the product into the usual powdery form of commercial cement.

The burden of decomposing and reconverting the calcium hydroxide to an oxide may be removed from the clinkering operation by dehydrating the powdery composition or mixture prior to clinkering, and this may readily be accomplished by utilizing the waste heat from the clinkering kiln and thus accomplish the aforesaid change prior to subjecting it to the action of the clinkering kiln, thereby greatly reducing the time of clinkering and effecting an important heat economy in the operation of the kiln and thus reducing the cost of the product. The waste heat may be obtained from the products of the clinkering kiln, as the clinker itself, the products of combustion of the fuel for producing the clinkering heat, the stack gases, or heat which is ordinarily lost by radiation from the kiln. By this step of dehydrating, prior to clinkering, there is considerable shrinkage of the particles of the material which further increases the degree of fineness of the mass.

Following the step of dehydration, just described, the material being in an impalpably fine condition and entered into the kiln at approximately the temperature at which it is dehydrated, will quickly react to the temperature in the kiln or furnace and go into combination or effect combining of the elements without balling up and without the production of uncombined centers in the clinker, thus producing a clinker of a nature that can be reduced to powder or pulverized with considerably less resistance than has heretofore been possible in methods wherein the material is brought practically to a point of fusion in the clinkering kiln in order to combine the elements. Furthermore, the powdery form and high temperature of the dehydrated mass lends itself to economy in the use of fuel and in the cost of carrying out the clinkering step. Subsequent to or before pulverizing, a suitable material, such as plaster of paris or gypsum may be added.

As the result of hydration, all of the lime may not have reacted to hydration, and consequently there may be some particles of lime remaining in a carbonate form, which carbonate particles would not properly clinker in the same time and at the same temperature as required for lime in an oxide form, thus when the clinker is pulverized producing a cement which is unsound in parts. To obviate this undesirable result and obtain a product which has completely reacted to hydration and consequently is such that it will properly clinker and produce a sound cement when pulverized, the material is subjected to classification in order to separate therefrom the coarse particles of lime in carbonate form which have not reacted to hydration and disintegration. These carbonate particles separated by classification may be again subjected to calcination and hydration along with other raw materials.

From the foregoing explanation of the present method, it will be understood that the calcareous and argillaceous materials are first subjected to an elevated temperature, short of clinkering, thereby preventing the formation of calcium silicates and calcium aluminates of lime in the calcareous material, but such as will convert the carbonate thereof to oxide form, i. e. lime; drive off volatile matter; and also dehydrate the argillaceous material and such other ingredients as may be present. Then the heat-treated calcareous material, in its physical condition as the result of the heat-treatment thereof, is hydrated to bring it to a fine powdery condition. The heat-treated argillaceous material and the hydrated calcareous material are then intimately mixed, and if desired they may be dehydrated which will further break down the powdery mass and increase its fineness. The next step is to clinker the powdery mass, and the final step is the grinding or pulverizing of the clinker.

In hydrating the heat-treated material, should it contain a low percentage of calcium oxide, there is added an amount of water in excess of that required to effect a complete hydration of the lime present. Also the temperature is preferably elevated above that produced by the exothermic heat developed during the chemical reaction incident to hydration by applying heat to the hydrator in which the material is being hydrated, whereby the excess water and additional heat assures a more violent hydration of the material into more finely divided particles as well as a more thorough mixing of the particles of the mass.

In subjecting the heat-treated calcareous material, containing a high percentage of lime oxide, to hydration, it is sufficient to use only such a quantity of water as will produce complete hydration of the lime, and then sufficient exothermic heat and agitation will be produced to assure the production of an extremely fine powdery mass.

Should the material to be hydrated contain an excess of lime oxide, or an insufficient amount of lime oxide, to produce a composition having the requisite ingredients for making cement, such elements or ingredients in which the composition may be deficient may be added in order to provide a chemically balanced composition. Should the ingredient in which the composition is deficient comprise either calcareous or argillaceous material, such material may be heat treated before it is added to the composition.

The present method of making cement may be carried out as a continuous system, or the heat-treated and hydrated mixture may be produced in batches, and subsequently clinkered and ground.

In carrying out the invention in a continuous system, i. e., calcining, hydrating, clinkering and pulverizing, the steps may follow one another immediately without any loss of time between the successive steps, and the dehydrating, immediately prior to clinkering, by the utilization of the waste heat from the clinkering operation, may be readily accomplished.

In a continuous system, should the material to be hydrated contain a low lime oxide content, the hydrated material will be in the form of a slurry when it leaves the hydrator, due to the use of excess water as hereinbefore described. This slurry may then be subjected to dehydration, before it is entered into the clinkering kiln, to expel the excess water in the mass and bring the mass to a powdery form. For dehydrating the slurry there may be utilized the waste heat from the clinkering operation as hereinbefore described.

When it is desired to produce the heat-treated and hydrated material in batches, the hydrated material may be brought to a state of dryness by subjecting it to an elevated temperature, as by the application of heat to the hydrator in which the material is hydrated.

According to the present invention there is economically produced a high early strength or quick hardening cement, and the usual step of grinding the raw material or materials is eliminated.

What is claimed is:

1. In the making of Portland cement and preparatory to clinkering, the providing of raw material having a lime base, subjecting said material to a temperature such as will convert the lime base to an oxide but insufficient to produce hydraulic properties in the heat-treated material, and then subjecting the heat-treated material to hydration while said material is in the physical 2. In the making of Portland cement and preparatory to clinkering, the providing of raw material having a lime base, subjecting said material to a temperature such as will convert the lime base to an oxide but insufficient to form silicates and aluminates of lime, and then subjecting the heat-treated material to hydration while said material is in the physical condition as the result of the heat-treatment thereof.

3. In the making of Portland cement and preparatory to clinkering, the providing of raw material having a lime base, subjecting said material to a temperature such as will convert the lime base to an oxide but insufficient to produce hydraulic properties in the heat-treated material, then subjecting the heat-treated material to hydration while said material is in the physical condition as the result of the heat-treatment thereof, and dehydrating the material preparatory to clinkering.

4. In the making of Portland cement and preparatory to clinkering, the providing of raw material having a lime base, subjecting said material to a temperature such as will convert the lime base to an oxide but insufficient to produce hydraulic properties in the heat-treated material, subjecting the heat-treated material to hydration while said material is in the physical condition as the result of the heat treatment thereof, and separating the carbonate particles which have not fully reacted to hydration.

5. In the making of Portland cement and preparatory to clinkering, the providing of raw material having a lime base, subjecting said material to a temperature such as will convert the lime base to an oxide but insufficient to produce hydraulic properties in the heat-treated material, subjecting the heat-treated material to hydration while said material is in the physical condition as the result of the heat-treatment thereof, dehydrating the material, and separating the carbonate particles which have not fully reacted to hydration.

6. In the making of Portland cement and preparatory to clinkering, the providing of raw material having a lime base, subjecting said material to a temperature such as will convert the lime base to an oxide but insufficient to produce hydraulic properties in the heat-treated material, then subjecting the heat-treated material to hydration while said material is in the physical condition as the result of heat-treatment thereof, mixing the hydrated material with argillaceous material preparatory to clinkering, and separating the carbonate particles which have not fully reacted to hydration.

7. In the making of Portland cement and preparatory to clinkering, the providing of raw material having a lime base, subjecting said material to a temperature such as will convert the lime base to an oxide but insufficient to produce hydraulic properties in the heat-treated material, then subjecting the heat-treated material to hydration while said material is in the physical condition as the result of the heat-treatment thereof, mixing the hydrated material with argillaceous material, dehydrating the mixture preparatory to clinkering, and separating the carbonate particles which have not fully reacted to hydration.

8. In the making of Portland cement and preparatory to clinkering, the providing of a calcareous material and an argillaceous material, dehydrating the argillaceous material, subjecting the calcareous material to a temperature such as will convert the lime present therein to an oxide but insufficient to produce hydraulic properties in the calcareous material, then subjecting the heat-treated calcareous material to hydration while said calcareous material is in the physical condition as the result of the heat-treatment thereof, and mixing the hydrated calcareous and dehydrated argillaceous materials.

9. In the making of Portland cement and preparatory to clinkering, the providing of a calcareous material and an argillaceous material, dehydrating the argillaceous material, subjecting the calcareous material to a temperature such as will convert the lime present therein to an oxide but insufficient to produce hydraulic properties in the heat-treated calcareous material, then subjecting the heat-treated calcareous material to hydration while said calcareous material is in the physical condition as the result of the heat-treatment thereof, mixing the hydrated calcareous and dehydrated argillaceous materials, and dehydrating the mixture preparatory to clinkering.

10. In the making of Portland cement and preparatory to clinkering, the providing of a calcareous material and an argillaceous material, dehydrating the argillaceous material, subjecting the calcareous material to a temperature such as will convert the lime present therein to an oxide but insufficient to produce hydraulic properties in the calcareous material, subjecting the heat-treated calcareous material to hydration while said calcareous material is in the physical condition as the result of the heat-treatment thereof, mixing the hydrated calcareous and dehydrated argillaceous materials, and separating the carbonate particles which have not fully reacted to hydration.

11. In the making of Portland cement and preparatory to clinkering, the providing of a calcareous material and an argillaceous material, dehydrating the argillaceous material, subjecting the calcareous material to a temperature such as will convert the lime present therein to an oxide but insufficient to produce hydraulic properties in the calcareous material, subjecting the heat-treated calcareous material to hydration while said calcareous material is in the physical condition as the result of the heat-treatment thereof, mixing the hydrated calcareous and dehydrated argillaceous material, dehydrating the mixture, and separating the carbonate particles which have not fully reacted to hydration.

12. The herein described method of making Portland cement comprising the providing of raw material having a lime base, subjecting said material to a temperature such as will convert the lime base to an oxide but insufficient to form silicates and aluminates of lime, subjecting the heat treated material to hydration while said material is in the physical condition as the result of the heat treatment thereof, dehydrating argillaceous material, mixing the dehydrated and the hydrated materials, clinkering the mixture, and grinding the clinker into powdery form.

13. The herein described method of making Portland cement comprising the providing of raw material having a lime base, subjecting said material to a temperature such as will convert the lime base to an oxide but insufficient to form silicates and aluminates of lime, subjecting the heat treated material to hydration while said material is in the physical condition as the result of the heat treatment thereof, dehydrating argillaceous material, mixing the dehydrated and the hydrated materials, dehydrating the mixture, clinkering the dehydrated mixture, and grinding the clinker to powdery form.

14. The herein described method of making Portland cement comprising the providing of raw material having a lime base, subjecting said material to a temperature such as will convert the lime base to an oxide but insufficient to form silicates and aluminates of lime, subjecting the heat treated material to hydration while said material is in the physical condition as the result of the heat treatment thereof, dehydrating argillaceous material, mixing the dehydrated and the hydrated materials, clinkering the mixture, grinding the clinker to powdery form, and dehydrating the mixture preparatory to clinkering by utilization of heat products of the clinkering operation.

15. The herein described method of making Portland cement comprising the providing of raw material having a lime base, subjecting said material to a temperature such as will convert the lime base to an oxide but insufficient to form silicates and aluminates of lime, subjecting the heat treated material to hydration while said material is in the physical condition as the result of the heat treatment thereof, dehydrating argillaceous material, mixing the dehydrated and the hydrated materials, clinkering the mixture, grinding the clinkering to powdery form, and separating the carbonate particles which have not fully reacted to hydration prior to clinkering.

WILLOUGHBY E. SNYDER.